United States Patent
Song et al.

(10) Patent No.: US 8,959,996 B2
(45) Date of Patent: Feb. 24, 2015

(54) WATER METER CASING HAVING A MIDDLE CASING AND INLET AND OUTLET PORTS FORMED AS SEPARATE COMPONENTS

(75) Inventors: Caihua Song, Yingtan (CN); Ming Luo, Yingtan (CN); Guomin Xu, Yingtan (CN)

(73) Assignee: Jiangxi Sanchuan Water Meter Co., Ltd, Yintan (CN)

( * ) Notice: Subject to any disclaimer, the term of this patent is extended or adjusted under 35 U.S.C. 154(b) by 375 days.

(21) Appl. No.: 13/390,518

(22) PCT Filed: Aug. 16, 2010

(86) PCT No.: PCT/CN2010/001238
§ 371 (c)(1),
(2), (4) Date: Feb. 15, 2012

(87) PCT Pub. No.: WO2011/020291
PCT Pub. Date: Feb. 24, 2011

(65) Prior Publication Data
US 2012/0137766 A1  Jun. 7, 2012

(30) Foreign Application Priority Data

Aug. 15, 2009  (CN) .......................... 2009 1 0115977
Aug. 15, 2009  (CN) .......................... 2009 1 0115978
Aug. 15, 2009  (CN) .......................... 2009 2 0188609

(51) Int. Cl.
*G01F 15/14*  (2006.01)
*G01F 5/00*   (2006.01)
*B21D 26/033* (2011.01)

(52) U.S. Cl.
CPC .............. *G01F 15/14* (2013.01); *B21D 26/033* (2013.01)

USPC .......................................... 73/273; 137/599.13

(58) Field of Classification Search
CPC ................................ G01F 15/18; G01F 15/185
USPC .............................................................. 73/273
See application file for complete search history.

(56) References Cited

U.S. PATENT DOCUMENTS

| 2,188,752 A * | 1/1940 | Houghton ..................... 418/191 |
| 4,061,032 A * | 12/1977 | Friebel ............................ 73/273 |
| 4,586,383 A * | 5/1986 | Blomquist ....................... 73/706 |
| 6,178,816 B1 * | 1/2001 | Katzman et al. ................ 73/201 |

FOREIGN PATENT DOCUMENTS

| CN | 201041498 Y * | 3/2008 | ................ G01F 7/00 |
| GB | 2023748 A * | 1/1980 | ................ G01F 1/06 |

OTHER PUBLICATIONS

Author: unknown, Title: machine translation of CN 201041498 Y, Date: Mar. 2008, Publisher: Google Patent website.*

* cited by examiner

*Primary Examiner* — Harshad R Patel
(74) *Attorney, Agent, or Firm* — Eagle IP Limited; Jacqueline C. Lui

(57) ABSTRACT

A water meter casing and manufacturing process thereof are provided. The water meter casing comprises a middle casing (1), a water inlet port (2) and a water outlet port (3), which are separate parts, wherein a water inlet (4) and a water outlet (5) where the water inlet and outlet ports (2, 3) are arranged are respectively provided at the two sides of the middle casing (1), and a support ring (6) is also provided in the inner cavity of the middle casing (1). The manufacturing process of the water meter casing relates to a method of forming the water meter casing by high pressure hydraulic bulging. The manufacturing process is simple and easy to carry out, and it presents the advantage of low cost.

7 Claims, 1 Drawing Sheet

WATER METER CASING HAVING A MIDDLE CASING AND INLET AND OUTLET PORTS FORMED AS SEPARATE COMPONENTS

TECHNICAL FIELD

The present invention relates to a water meter casing and a manufacturing process for the same.

BACKGROUND ART

Nowadays metallic water meter casings are all molded by one piece casting of the prior art because of their relatively complicated structures. This kind of casting technique of molding by one piece casting may result in that the wall of the water meter casing is very thick and that the cost for casting is relatively high, thereby leading to a relatively high cost of production for the metallic water meter casing. Moreover, derivatives which are harmful to the human body may be generated during the process of one piece casting, or there may be certain substances required to be added for products molding which are mostly harmful to the human body.

CONTENTS OF THE INVENTION

1. Technical Problem to Be Solved

The objective of the present invention is to provide a water meter casing which is simple for processing and has a lower cost of production, and to provide a manufacturing process for the same.

2. Technical Solution

For this purpose, the present invention provides a water meter casing, which comprises: a middle casing, a water inlet port and a water outlet port. The said middle casing, water inlet port and water outlet port are separate components; a water inlet and a water outlet where the water inlet port and the water outlet port are arranged are respectively provided at the two sides of the middle casing.

A baseplate of the middle casing and other parts of the middle casing are connected in a split type, and the middle part of said baseplate is inwardly concave, and a convex stand is formed in the middle portion of the inner cavity of the middle casing (1).

Further comprising a fluid director provided inside said water inlet port, and an external adjusting fluid director (10) provided inside the water outlet port (3).

Further comprising a movement guider provided inside said middle casing, and a support ring provided inside the inner cavity of said middle casing.

The water inlet port and water outlet port are respectively welded on the water inlet and the water outlet.

The threads at the water inlet port and the water outlet port as well as the threads at the middle casing port are molded by punching or rolling, said threads are pipe threads or metric threads.

The water inlet port, the water outlet port as well as the upper end port of the middle casing are respectively welded with threaded studs which are separately processed.

The parts of said water meter casing are separately formed by welding two split halves.

The present invention further provides a manufacturing process for processing above-mentioned water meter casing, which uses the high pressure liquid bulging method to process and mold said water meter casing.

The high pressure liquid bulging method comprises the water bulging method and the hydraulic method, in which the water bulging method is used for processing and molding the middle casing of said water meter casing and the hydraulic method is used for processing and molding the water inlet port and the water outlet port of said water meter casing.

3. Beneficial Effects

Since the middle casing, the water inlet port and the water outlet port of the water meter casing are separate components, and the structure of each of the separate components is relatively simple, the water meter casing processed by the manufacturing process of the present invention can be processed and molded only by means of punching or other ways, accordingly greatly reduce the thickness of the components, increase the labour productivity, save the resources and lower the cost of production. Furthermore, the process is simple and easy to carry out. As the water meter casing uses materials which conform to the hygienic standard for manufacturing, it has the advantages such as environmental protection and low carbon and eliminating secondary pollution of the tap water, etc.

Wherein, 1: middle casing; 2: water inlet port, 3: water outlet port, 4: water inlet; 5: water outlet; 6: support ring; 8: baseplate; 9: fluid director; 10: external adjusting fluid director; 11: movement guider.

Modes For Carrying Out The Invention

The following embodiments are used for describing the present invention, but not for limiting the scope of the present invention.

Figure 1:
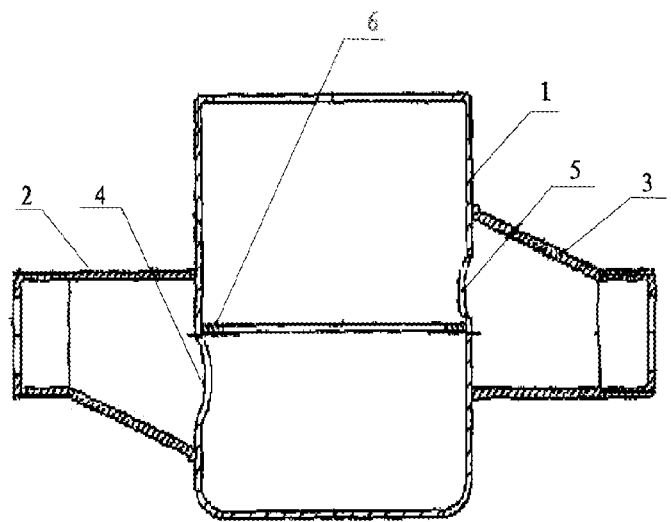
FIG. 1 is a structural schematic view of the water meter casing of a first embodiment of the present invention.

A structural schematic view of the water meter casing of the first embodiment of the present invention is shown in FIG. 1. This embodiment comprises a middle casing 1, a water inlet port 2 and a water outlet port 3, wherein the middle casing 1, the water inlet port 2 and the water outlet port 3 are all separate components, and all manufactured by punching. The two sides of the middle casing 1 are respectively provided with a water inlet 4 and a water outlet 5. The water inlet port 2 and the water outlet port 3 are respectively installed at the water outlet 4 and the water inlet 5 on the two sides of the middle casing 1 by means of welding or other ways.

Figure 2:
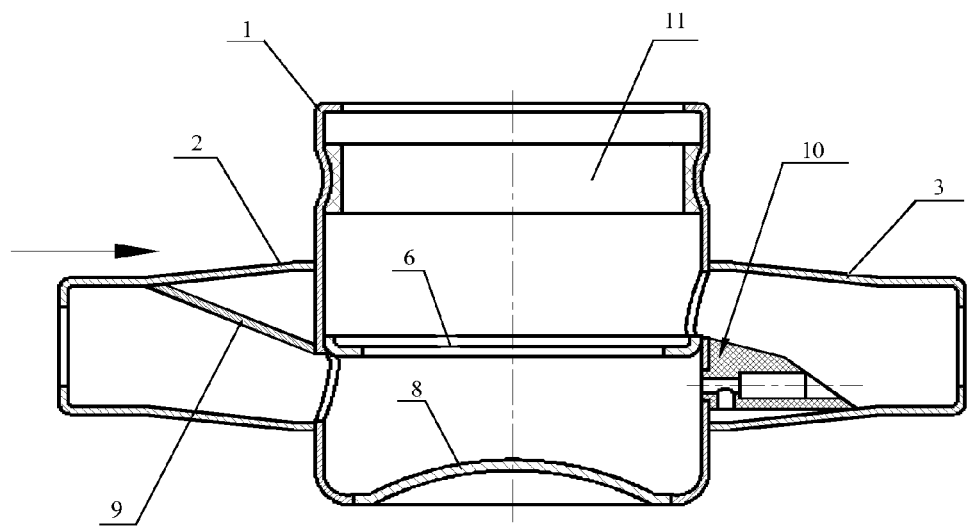
FIG. 2 is a structural schematic view of the water meter casing of a second embodiment of the present invention.

A structural schematic view of the water meter casing of the second embodiment of the present invention is shown in FIG. 2. A baseplate 8 of the middle casing 1 and other parts of the middle casing 1 are connected in a split type, and the middle portion of the baseplate 8 is inwardly concave. The baseplate 8 is connected with other parts of the middle casing 1 by way of welding.

This embodiment also comprises a fluid director 9, which is a separate component provided inside the water inlet port 2. The fluid director 9 can be a baffle provided inside the water inlet port 2 by way of welding, or directly placed in the water inlet port 2, of which the material can be stainless steel plates or plastic. The fluid director can achieve the functions of improving the stability of water flow and reducing the damage due to impact pressure to the water meter from the water flow.

This embodiment also comprises an external adjusting fluid director 10, which is a separate component provided inside the water outlet port 3 by way of welding, or directly placed in the outlet port 3, of which the material can be stainless steel plates or plastics. Inside the external adjusting fluid director 10, a hole is provided in the horizontal direction, the sectional area of the end where the hole is connected to the middle casing 1 is small, and an outlet connected with the water outlet port 3 is vertically provided at the lower end of the hole; the sectional area of the other end of the hole is large, and is provided with an adjusting bolt. The external adjusting fluid director 10 allows the water which flow into the middle casing 1 to directly enter into the water outlet port 3 without passing through the movement. The flow quantity and flow rate of the outflow vary depending on the position of the adjusting bolt, so as to adjust the speed of the water meter and the quantity of the water flow, thereby obtaining the effects of improving the stability of water flow, reducing the damage due to impact pressure to the water meter from the water flow, and adjusting the measuring accuracy of the water meter.

This embodiment also comprises a movement guider 11. It is a separate component in the form of a circular ring provided at the closed end of the internal upper portion of the middle casing 1, of which the material can be stainless steel plates or plastics. The movement guider can be installed in the middle casing 1 by welding or other ways, so that it is more convenient to be put in or taken out.

A support ring 6 is provided inside the inner cavity of the middle casing 1, which is a separate component, for placing the movement. The threads at the water inlet port and the water outlet port, as well as the threads at the middle casing port are molded by punching, cutting or rolling, particularly forming as pipe threads or metric threads.

The middle portion of the middle casing 1 of the present embodiment appears as an annular concave shape, so that a convex stand can be formed for placing the movement. Such convex stand plays the role of the support ring 6. Every part of the water meter casing of the present invention can be formed by welding two split halves.

In another embodiment of the present invention, the water inlet port, the water outlet port and the upper end port of the middle casing can be respectively welded with metric threaded studs which are respectively processed.

The present invention further provides a manufacturing process for processing the water meter casing, which uses the high pressure liquid bulging method to process and mold the water meter casing. Such high pressure liquid bulging method comprises the water bulging method and the hydraulic method. The present embodiment adopts the water bulging method to process and mold the middle casing of the water meter casing, and adopts the hydraulic method to process and mold the water inlet port and the water outlet port of the water meter casing.

Industrial Applicability

Since the middle casing, the water inlet port, the water outlet port, the baseplate, the support ring, the fluid director, the external adjusting fluid director and the movement guider of the water meter casing are all separate components, and the structure of each of the separate components is relatively simple, the water meter casing processed by the manufacturing process of the present invention can be processed and molded only by means of punching, cutting or other ways. Moreover, it is possible to install several ones among these components according to the requirements, or to install all of them, so as to greatly reduce the thickness of the components, increase the labour productivity, save the resources and lower the cost of production. Furthermore, the process is simple and easy to carry out. The materials are selected to be formed by a combination of stainless steel plates or sections which have superior anti-corrosion properties. As the water meter casing uses materials which conform to the hygienic standard for manufacturing, it has the advantages such as environmental protection, etc. and solves the problem of secondary pollution of the tap water caused by the water meter; Besides, the baseplate of the water meter casing is in a concave shape, which may increase the compression strength of the water meter casing.

What is claimed is:

1. A water meter casing comprising a middle casing, a water inlet port configured to receive a flow of water and a water outlet port; wherein said middle casing further comprises a water inlet, a water outlet and a supporting ring; wherein said water inlet port is configured to be coupled with said water inlet of said middle casing and said water outlet port is configured to be coupled with said water outlet of said middle casing; wherein said water inlet is located at a first wall of said middle casing and said water outlet is located at a second wall of said middle casing; wherein said water outlet is higher than said water inlet; wherein said support ring is located in an inner cavity of said middle casing and is configured to support a movement thereon; wherein said supporting ring is located between said water inlet and said water outlet; wherein said water inlet port further comprises a fluid director disposed therein, said fluid director being a baffle extending from an upper end of said water inlet to an upper wall of said water inlet port; wherein said fluid director is configured to adjust the stability of water flow thereby reducing damage due to said flow of water; and wherein said water outlet port further comprises an external adjusting fluid director disposed therein, said external adjusting fluid director further comprises a first hole connected to said middle casing, a second hole connected to said water outlet port and an outlet connected to said water outlet port, wherein said first hole, said second hole and said outlet are in fluid communication to each other.

2. The water meter casing of claim 1, wherein said middle casing further comprises a baseplate coupled to a bottom portion of said middle casing; wherein said baseplate is bent towards said inner cavity of said middle casing thereby providing a stand for said movement.

3. The water meter casing of claim 1, wherein said fluid director is made of materials selected from a group consisting of stainless steel and plastic.

4. The water meter casing of claim 1, wherein said middle casing further comprises a movement guider disposed within said the inner cavity of said middle casing;
wherein said movement guider is higher than said water outlet and is provided at a closed distal end of said middle casing.

5. The water meter casing of claim 4, wherein said movement guider is a circular ring made of materials selected from a group consisting of stainless steel and plastic.

6. The water meter casing of claim 1, wherein said first hole and said second hole are interconnected to each other to form a duct; and wherein said outlet is vertically provided at the lower end of said duct.

7. The water meter casing of claim 1, wherein said second hole is larger than said first hole.

\* \* \* \* \*